(12) United States Patent
McLean

(10) Patent No.: US 9,552,231 B2
(45) Date of Patent: Jan. 24, 2017

(54) CLIENT CLASSIFICATION-BASED DYNAMIC ALLOCATION OF COMPUTING INFRASTRUCTURE RESOURCES

(71) Applicant: Kent McLean, Saratoga Springs, UT (US)

(72) Inventor: Kent McLean, Saratoga Springs, UT (US)

(73) Assignee: Adobe Systems Incorporated, San Jose, CA (US)

( * ) Notice: Subject to any disclaimer, the term of this patent is extended or adjusted under 35 U.S.C. 154(b) by 240 days.

(21) Appl. No.: 13/628,868

(22) Filed: Sep. 27, 2012

(65) Prior Publication Data
US 2014/0089511 A1    Mar. 27, 2014

(51) Int. Cl.
G06F 9/50      (2006.01)
H04L 29/08    (2006.01)
H04L 12/26    (2006.01)
H04L 12/24    (2006.01)

(52) U.S. Cl.
CPC ............ G06F 9/5061 (2013.01); H04L 67/10 (2013.01); *G06F 2209/501* (2013.01); *G06F 2209/502* (2013.01); *G06F 2209/508* (2013.01); *H04L 41/0896* (2013.01); *H04L 41/5096* (2013.01); *H04L 43/0817* (2013.01)

(58) Field of Classification Search
CPC ..... G06F 12/00; H04L 29/0845; H04L 5/0035
USPC ........................................................ 709/226
See application file for complete search history.

(56) References Cited

U.S. PATENT DOCUMENTS

| | | | |
|---|---|---|---|
| 8,037,187 B2 | 10/2011 | Dawson et al. | |
| 8,396,845 B2 * | 3/2013 | Bahat et al. | 707/694 |
| 8,448,171 B2 * | 5/2013 | Donnellan et al. | 718/1 |
| 8,504,689 B2 * | 8/2013 | Ferris et al. | 709/226 |
| 8,762,531 B1 * | 6/2014 | Yemini et al. | 709/226 |
| 2004/0267897 A1 * | 12/2004 | Hill et al. | 709/217 |
| 2009/0300210 A1 | 12/2009 | Ferris | |
| 2010/0076856 A1 | 3/2010 | Mullins | |
| 2010/0211958 A1 | 8/2010 | Madison, Jr. et al. | |
| 2011/0004574 A1 * | 1/2011 | Jeong | G06F 9/5066 706/12 |
| 2011/0138055 A1 | 6/2011 | Daly et al. | |
| 2011/0185064 A1 | 7/2011 | Head et al. | |
| 2011/0270968 A1 * | 11/2011 | Salsburg et al. | 709/224 |

(Continued)

*Primary Examiner* — Kevin Bates
*Assistant Examiner* — Chen-Liang Huang
(74) *Attorney, Agent, or Firm* — Kilpatrick Townsend & Stockton LLP

(57) ABSTRACT

Methods and apparatus for classification-based dynamic allocation of computing resources are described. A method comprises determining usage data sources corresponding to one or more clients of a computing infrastructure, and assigning values to client classification categories associated with a particular client based on metrics obtained from the particular client's usage data sources. The method includes generating a recommendation mapping between values of the client classification categories, and one or more resources of the infrastructure, based at least in part on resource classification information. The method further includes allocating at least a portion of the one or more resources to the particular client based at least in part on the recommendation mapping.

20 Claims, 8 Drawing Sheets

(56) References Cited

U.S. PATENT DOCUMENTS

| | | |
|---|---|---|
| 2011/0295986 A1* | 12/2011 | Ferris .................... G06F 9/5072 709/222 |
| 2012/0022910 A1 | 1/2012 | Chi et al. |
| 2012/0042256 A1* | 2/2012 | Jamjoom et al. ............. 715/736 |
| 2012/0089726 A1 | 4/2012 | Doddavula |
| 2012/0166323 A1 | 6/2012 | Guo |

* cited by examiner

| | Allocation Bucket | Time Period | Processing | Storage | Network | Memory | Budget | Geography | Client Profile |
|---|---|---|---|---|---|---|---|---|---|
| Client-C1 | N.A. | 1/1/2012 - 1/31/2012 | High | Medium | High | Low | High | 90% U.S. East | Long-term, high growth |
| Client-C2 | N.A. | 2/1/2012 - 2/15/2012 | Low | High | Low | High | Low | 100% U.S. West | Medium-term, medium-growth |
| Client-C3 | N.A. | 12/1/2011 - 2/28/2012 | High | High | High | High | High | 50% U.S. West, 50% Asia | Short-term, high-growth |
| Client-C4 | Database-OLTP | 2/15/2012-2/22/2012 | High | Low | High | High | High | 50% U.S. East, 50% U.S. West | |
| Client-C4 | Database-Data Warehouse | 1/1/2012-2/28/2012 | High | High | Medium | Low | Medium | 100% U.S. Central | |
| Client-C4 | WebApp1 | 1/1/2012-2/28/2012 | Medium | Low | High | Medium | Medium | 70% U.S., 30% Foreign | |
| Client-C4 | Backup Service | 1/1/2012-1/31/2012 | Low | High | High | Low | Low | 100% U.S. West | Long-term, medium-growth |

FIG. 3

Resource Identifiers 405

Resource Classification Categories 410

| | Location | Processing capacity | Storage capacity | Networking capacity | Memory | Operating cost |
|---|---|---|---|---|---|---|
| Server-S1 | DC-004, U.S East | P7 | S4 | N8 | M10 | C6 |
| Server-S2 | DC-009, U.S. West | P2 | S2 | N5 | M5 | C4 |
| Server-S3 | DC-104, Asia | P1 | S3 | N5 | M1 | C1 |
| Server-S4 | DC-076, U.S. Central | P10 | S10 | N3 | M8 | C10 |

Optional recommended allocation period 525

| | Allocation Bucket | Allocation Time Period | Recommended Resources |
|---|---|---|---|
| Client-C1 | N.A. | 2/1/2012 - 2/28/2012 | S33, S64 |
| Client-C2 | N.A. | 2/16/2012 - 3/1/2012 | S432 |
| Client-C3 | N.A. | 3/1/2012 - 6/30/2012 | S643, S644, S645 |
| Client-C4 | Database-OLTP | 2/23/2012-3/1/2012 | S54, S55, S56, S57 |
| Client-C4 | Database-Data Warehouse | 2/1/2012-2/28/2012 | S22, S23 |
| Client-C4 | WebApp1 | 3/1/2012-7/1/2012 | S900, S901 |
| Client-C4 | Backup Service | 2/1/2012-3/31/2012 | S776 |

. . .

FIG. 5 ic infrastructure resources are described. According to one embodiment, a method may include determining a respective set of infrastructure usage data sources (such as performance monitors or other tools) associated with each of one or more clients of a computing infrastructure. The method may further include assigning, to one or more client classification categories (such as processing power, storage capacity, memory capacity, or network bandwidth) associated with a particular client of the one or more clients, a respective client classification value, based at least in part on one or more metrics obtained from the particular client's set of infrastructure usage data sources. The classification values may be selected from among a discrete set of possible choices, such as "High", "Medium" or "Low", for at least some of the categories in some embodiments. The method
CLIENT CLASSIFICATION-BASED DYNAMIC ALLOCATION OF COMPUTING INFRASTRUCTURE RESOURCES

BACKGROUND

Description of the Related Art

In recent years, more and more computing services have been offered via network access by a number of infrastructure providers. The services vary along such dimensions as the types of resources and/or applications supported, the extent of control granted to clients (e.g., whether clients are given "root access" to the virtual or physical computing resources allocated to their use), the kinds of programmatic interfaces provided to clients, the nature of the network connectivity required between client devices and provider resources (e.g., whether private or closed networks are used, or whether the public Internet may be used), and so on. In many cases, a provider of computing infrastructure may have established multiple geographically-distributed data centers, investing substantial amounts in the equipment and facilities. At least in some scenarios, a given client may not be interested in, or even aware of, the specific servers, data centers or geographical locations from which the client's requests are serviced, as long as the desired functionality is provided, and service level agreements regarding performance, availability, and cost can be supported.

An infrastructure provider may use a number of different factors to initially allocate resources to be used by a given client, e.g., a particular set of storage devices may be selected to store database tables containing the client's data sets based on such factors as the amount of data storage currently available at a given data center at the time at which the client first becomes a subscriber, the particular server that happened to receive the client's request for database space, and/or on an expected rate of database transactions from the client. However, the actual use of the resources by a client may vary over time, and may differ from the levels of resource usage initially expected. In addition, the mix of resources that are available for allocation to clients by a provider may also change over time, as new generations of hardware or software resources are brought online, or as integrations with third-party resource providers become easier to implement. As a result, at least some of the initial resource allocation decisions made by the provider may turn out to be suboptimal.

SUMMARY

Various embodiments of methods and apparatus for client classification-based dynamic allocation of computing infrastructure resources are described. According to one embodiment, a method may include determining a respective set of infrastructure usage data sources (such as performance monitors or other tools) associated with each of one or more clients of a computing infrastructure. The method may further include assigning, to one or more client classification categories (such as processing power, storage capacity, memory capacity, or network bandwidth) associated with a particular client of the one or more clients, a respective client classification value, based at least in part on one or more metrics obtained from the particular client's set of infrastructure usage data sources. The classification values may be selected from among a discrete set of possible choices, such as "High", "Medium" or "Low", for at least some of the categories in some embodiments. The method may also comprise generating a recommendation mapping identifying suitable resources or resource types for the client. One or more client classification values of the client may be mapped to one or more resources of the plurality of resources of the computing infrastructure, based at least in part on resource classification information associated with the one or more resources. The method may also include allocating at least a portion of the one or more resources to the particular client based at least in part on the recommendation mapping. In some embodiments an existing allocation may be modified based on a result of the mapping: for example, contents of database tables containing data may be moved from one set of storage devices to another, or a particular server of a public cloud data center may be deployed to execute an application that was previously being executed at a private cloud data center for the client. The classification and mapping generation may be performed iteratively in at least some embodiments, e.g., based on a schedule or in response to events or feedback from clients.

In at least some embodiments, the infrastructure usage data sources may include various monitors located at, or installed on, resources such as compute servers, storage servers, networking devices and the like. Clients may be classified based on any combination of a variety of categories in different embodiments, such as the needed compute performance, memory size, storage capacity, storage bandwidth, storage operation rate, network bandwidth, network operation rate, network latency, client budget, client geographical location, installed software stacks, application transaction rate, application availability, application security, or concurrent user count. Information about some of the categories (such as geographical location or client budget) may be obtained from sources other than the infrastructure usage data sources. In at least some embodiments, in addition to classification of clients, the method may include classification of resources.

In at least one embodiment, the method may include scheduling iterations of assignment of client classification values to the one or more client classification categories based on one or more scheduling criteria, such as (a) elapsed time since a previous assignment of client classification values, (b) a metric of data center resource utilization corresponding to a plurality of clients, (c) a metric of operating costs associated with the computing infrastructure, or (d) a metric of a client satisfaction.

According to one embodiment, the method may include identifying a plurality of allocation buckets associated with a particular client, including a first allocation bucket and a second allocation bucket, where the first allocation bucket comprises a first subset of resources allocated to the particular client and the second allocation bucket comprises a different subset of the resources allocated to the particular client. The allocation buckets for a given client may be distinguished from one another based on various criteria, such as (a) an identification of a respective application executed on behalf of the particular client at the first and second subsets of the resources, (b) an identification of a first type of service request directed by the client at the first subset and a second type of service request directed by the client at the second subset, or (c) a detection of a first pattern of service requests directed by the client to the first subset and a second pattern of service requests directed by the client to the second subset. The type of a service request may be determined, for example, based on the amount of time taken to respond to the service request. A respective recommendation mapping may be generated for each of the first and second buckets based at least in part on metrics obtained from infrastructure usage data sources associated with the first and second subset of resources.

BRIEF DESCRIPTION OF THE DRAWINGS

FIG. 3 illustrates examples of client classification values determined for various combinations of clients and client classification categories, according to at least some embodiments.

FIG. 4 illustrates examples of resource classification values determined for various combinations of resources and resource classification categories, according to at least some embodiments.

FIG. 5 illustrates examples of recommendation mappings that may be generated for clients, according to at least some embodiments.

Figure 1:
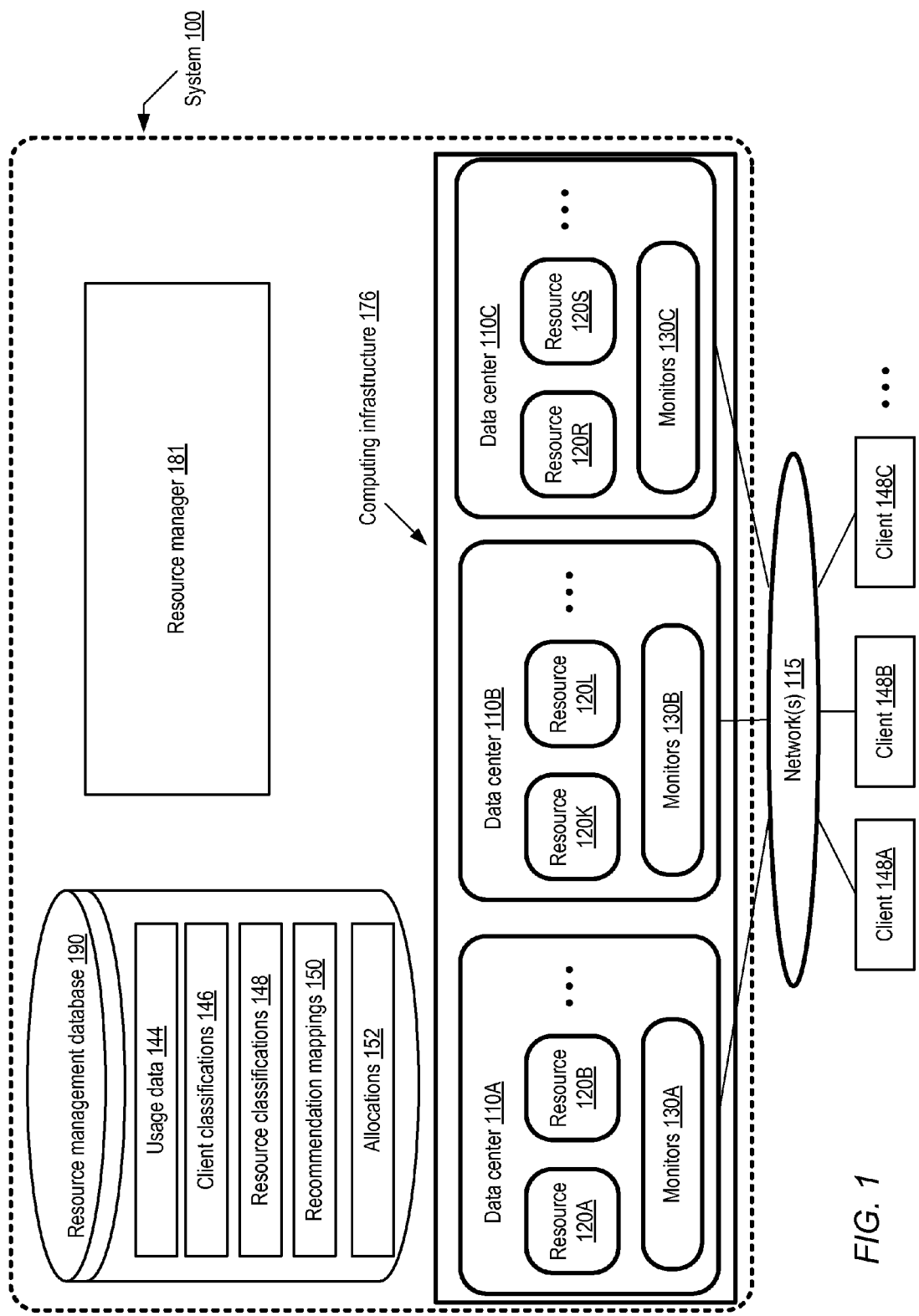
FIG. 1 illustrates an example system environment, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for client classification-based dynamic allocation of computing infrastructure resources are described. According to some embodiments, one or more computing devices may be configured to implement a resource manager for at least a subset of the computing infrastructure set up by an infrastructure provider to provide various network-accessible services to clients. The resource manager may be responsible for allocating various combinations of physical, virtual and/or logical resources (such as compute servers, storage devices, network devices, network devices, addresses/ports, and/or application-specific logical resources such as thread pools) provided by the computing infrastructure to different clients. In at least one embodiment, the resource manager may identify one or more infrastructure usage data sources (such as various resource monitors) from which resource usage metrics and/or patterns for a given client may be obtained. Resource usage information collected from the data sources may be used to classify the client with respect to one or more classification categories in such an embodiment. The resource manager may also determine, or have access to, resource classification information that categorizes different resources that are available for allocation to clients in some embodiments. Using the client classification information and the resource classification information, the resource manager may generate recommendation mappings identifying a set of resources that may be appropriate for use by a given client for a given application or for the combination of applications and services being used by the client. Such recommendation mappings may then be used to modify one or more existing resource allocations of the client, and/or to allocate one or more new resources to the client. In addition to resource usage metrics, a number of other factors may be taken into consideration by the resource manager when classifying clients and/or generating the recommendation mappings in some embodiments, such as the geographical location(s) of the resources and/or the client's premises, budget constraints of the client, operating costs for various parts of the computing infrastructure, client satisfaction metrics, and the like. In at least one embodiment, clients may be classified using an iterative process, where for example resource usage measurements for a particular client are collected over a specified period, resource allocation changes are made based on recommendations generated from the measurements, and the process is repeated periodically to ensure that the resources that best match the client's needs (and/or the provider's goals) are provided to the client.

FIG. 1 illustrates an example system environment, according to at least some embodiments. As shown, system 100 comprises a computing infrastructure 176 and a resource manager 181. In the depicted embodiment, resources 120 (e.g., 120A, 120B, 120K, 120L, 120R and 120S) of the computing infrastructure 176 are distributed among a plurality of data centers 110. For example, data center 110A comprises resources 120A and 120B, data center 110B comprises resources 120K and 120L, and data center 110C comprises resources 120R and 120S. Each data center 110 also comprises respective sets of resource monitors 130—e.g., monitors 130A at data center 110A, monitors 130B at data center 110B, and monitors 130C at data center 110C. The monitors 130 at a given data center 110 may collect resource usage metrics for some or all of the resources 120 present at that data center. Various types of metrics that may be collected for different resources are described in further detail below with respect to FIG. 2. In some embodiments, the different data centers may be distributed geographically across different states, regions or countries. In at least one embodiment, some of the resources 120 may be part of a "private cloud" environment whose use is restricted to one or more business entities or companies, while other resources 120 may belong to a "public cloud" that is accessible to the general public. In one embodiment, the entire computing infrastructure 176 supported by a given provider may be resident at a single data center 110.

At a given point in time, some combination of the resources 120 at one or more data centers 110 may be allocated for use by a given client 148, such as client 148A, 148B or 148C in the depicted embodiment. The term "client", as used herein, may refer broadly to any distinguishable set of one or more users, devices or entities that consume services provided via the computing infrastructure 176. A given client 148A may be distinguished from another client 148B based on any of various factors in different embodiments—e.g., business affiliation or company, billing account, user identifier(s) or logins, network address or address range from which service requests are received, and so on. Information about the set of resources allocated to different clients may be stored in a persistent store in some embodiments, as indicated by allocations 152 in resource management database 190 of the depicted embodiment. Clients 148 may access their allocated resources, or submit service requests that are satisfied using the allocated resources, via one or more networks 115. Depending on the types of services being provided, a given client 148 may be provided different levels of details regarding the resources allocated for the client's use. In some embodiments, where for example the infrastructure provider implements an application stack on behalf of the client, the client may be provided one or more network addresses (e.g., Internet Protocol or IP addresses) and one or more programmatic interfaces (e.g., an API or a set of web pages) through which application requests can be made, without necessarily providing details regarding the number of servers or other resources allocated for use by the client. In other embodiments, a client may be provided more specifics, such as the number and/or type of physical and/or virtualized servers, storage devices and the like that have been designated for use by the client. In at least some embodiments, a given resource 120 may be shared among several clients 148—e.g., a large storage server may comprise enough disk-based storage to meet several clients' needs. Thus, in at least some implementations, resources may be allocated in a shared mode, or a portion of a given resource (rather than the entire resource) may be allocated to a given client.

The resource manager 181 of system 100 may be responsible for resource allocation and re-allocation decisions. In at least one embodiment, the resource manager 181 may identify, for a given client 148, a set of client classification categories. For example, a client may be classified based on the types of applications used, the amount of processing or computations performed, the type or amount of storage space used, the network bandwidth used, the geographical locations of the client's own network or premises from which connectivity is established to computing infrastructure 176, the revenue generated for the infrastructure provider, and so on. For at least some of the categories identified for client classification, the resource manager 181 may be configured to identify respective infrastructure usage data sources for a given client 148, from which usage data 144 can be gathered to obtain values for the different classification categories. For example, the resource manager 181 may identify a particular resource monitor 130 that captures CPU utilization information at a compute server resource 120 currently allocated to a client 148A as a data source for client 148A, and use the CPU utilization information to classify the client 148A as a "heavy", "medium", or "light" user of processing capacity. Similarly, the resource manager 181 may identify storage space allocated for use by the client 148A at one or more storage device resources 120, and identify a storage monitoring tool that can provide metrics on the amount of storage used by the client, the manner in which I/O requests are distributed over time, the read-to-write ratio for the I/Os, and so on.

In some embodiments, monitors 130 or similar tools may be built in to, or provided with, the resources 120—e.g., an operating system or virtualization software in use at a particular compute server may provide monitoring tools for various types of resource use. Tools that may have to be installed separately (i.e., tools that do not come pre-installed) may be used for certain types of metrics in some embodiments. Network monitors of various types may be set up at various networking devices of the computing infrastructure, such as routers, switches and the like in some embodiments. Depending on the sophistication of the tools and/or monitors 130, and on the granularity at which resources 120 are assigned or allocated to clients 148, the resource manager 181 may need to post-process raw usage data obtained from the data sources in some implementations. For example, in some scenarios a monitoring tool may provide process-level statistics about CPU utilization, disk I/Os and the like, and the resource manager may be configured to identify the process identifiers of processes instantiated for a particular client 148, and use the process identifiers to determine the specific resource usage characteristics of the client. In other scenarios, e.g., when a resource is shared or when process-specific or client-specific data is unavailable, the resource manager 181 may have to use heuristics to estimate the resource usage of a given client 148—for example, if X megabits per second of network traffic is known to have been received at a given resource 120 from three different clients 148, and no further details regarding any of the clients' specific traffic rates is available, the resource manager may assume that each of the clients was responsible for one third of the X megabits per second.

In addition to determining the set of infrastructure usage data sources from which usage data 144 for a given client 148 can be collected, the resource manager 181 may also obtain various client characteristics from other sources in some embodiments. For example, the geographical locations of the client's office or data center premises, billing data and/or budget constraints of the client may be obtained from various business data sources that may be maintained separately from the resource management database 190. Some client information may be explicitly provided by the client, such as desired availability or security needs. Using the different types of data collected for a given client 148, the resource manager 181 may assign values for each of the client's classification categories. As noted earlier, client classification may be performed iteratively or periodically in some embodiments, so that, during a given iteration, a respective set of classification values for each of the categories considered may be obtained. Client classification entries 116 in resource management database 190 may include values for each client classification category of the clients in some implementations. In some embodiments, only the values for some number of recent iterations may be retained in the resource management database 190. Any of a number of different criteria may be used to schedule iterations of client classification in various embodiments. Iterations may be performed according to a fixed schedule (e.g., once every week or once a month), when certain events occur (e.g., an overall utilization resource of some set of infrastructure resource rises above, or falls below, a threshold), when operating costs for some portion of the infrastructure resource reach a threshold, or in response to a detection of unsatisfactory customer satisfaction metrics. In some embodiments, clients 148 may request classification iterations and/or recommendation mappings.

In the depicted embodiment, resource management database 190 may include resource classifications 148, which may include values for some combination of resource classification categories for some or all of the resources 120. For example, a number of different discrete levels or strata may be identified for classifying different aspects of a server's capabilities such as computing power, memory size, storage space, networking capacity, and the like, and each server may be assigned one of the levels for each of the different aspects or categories. In some embodiments, some resources may be classified using category-specific absolute metrics—e.g., for main memory size, example values may include "2 Gigabytes (GB) or less", "4 GB", "8 GB", "16 GB" and so on. In some embodiments, the resource manager 181 (or an administrator) may initiate inventory analysis of the computing infrastructure, e.g., periodically or when new resources are brought online, during which newly added resources 120 may be classified, and/or existing classifications of resources 120 may be verified. In some embodiments the classification of resources 120 may be performed iteratively in a manner similar to the way that client classification may be performed iteratively as described above.

Using the client classifications 146 and the resource classifications 148, the resource manager 181 may generate recommendation mappings 150 that match the needs of a particular client (as determined based at least in part on the client's classification values) with the capabilities of one or more resources 120 (as determined based at least in part on the resources' classification values) in the depicted embodiment. If the generated recommendation mappings are not already satisfied by the client's currently-allocated resources, one or more resource allocations may be modified—e.g., a resource 120 that is currently allocated to a client 148 may be de-allocated and a different resource may be allocated to that client instead, or, a new resource may be allocated to the client without requiring a corresponding de-allocation. The modification(s) may be implemented so as to cause minimal or no disruption to the client. In some embodiments, the client 148 may not be notified or informed of the change(s) unless the client has to change some aspect of its interactions with the infrastructure service as a result of the modification (e.g., if the client has to use a different IP address as a result of the change), or if a noticeable service interruption is expected. In other embodiments, the client 148 may be notified of resource allocation changes even if no client-side changes are needed and no interruptions are expected.

In at least some embodiments, the functionality of the resource manager may be distributed across a plurality of computing devices. For example, in one embodiment, a respective resource manager component or set of components may be implemented at each data center 110, and the components may be configured to cooperate with each other when cross-data-center allocation changes have to be made. Similarly, some or all of the data shown resident within database 190 of FIG. 1 may be distributed and/or replicated across multiple storage locations or devices in some embodiments. In at least one implementation, a portion of the metadata used for classification and/or mapping generation need not be stored in persistent storage—e.g., the data may be manipulated in volatile memory as needed.

Figure 2:
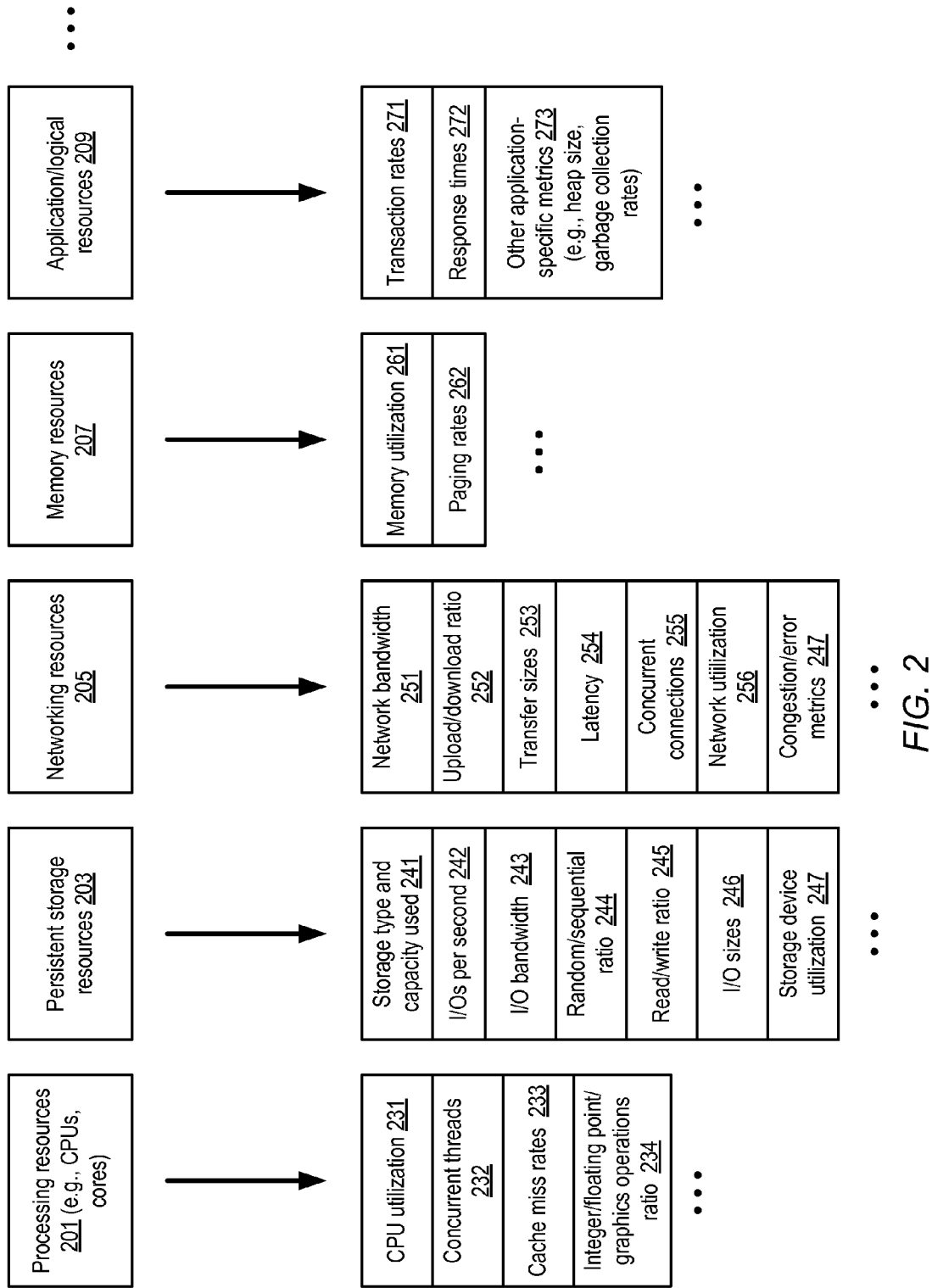
FIG. 2 illustrates examples of metrics that may be collected from infrastructure usage data sources for various clients, according to at least some embodiments.

FIG. 2 illustrates examples of metrics that may be collected from infrastructure usage data sources for various clients, according to at least some embodiments. A number of example metrics are shown for different types of resources. For processing resources 201 such as CPUs and cores, metrics such as CPU utilization 231 and/or concurrent threads 232 of execution may be collected from operating system tools or monitors in some embodiments. In some implementations, depending on the instrumentation available for the particular processors or cores in use, more detailed metrics such as cache miss rates 233 for the processor caches (e.g., level-1 data and instruction caches, level-2 caches, and/or level-3 caches) may be collected. In at least one implementation, different servers of the computing infrastructure may have different types of processing capabilities; for example, some servers may include graphical processing units (GPUs) as well as integer and floating point processing units. In such an implementation, processor or core instrumentation for the different types of executable instructions (e.g., integer, floating-point and graphics instructions) may provide operation ratios 234 for the different types of instructions executed on behalf of a given client workload.

With respect to persistent storage resources 203, the metrics collected may include the amount of capacity used 241 of various types of storage (e.g., magnetic disk drives of various kinds, optical drives of various kinds, or flash drives), the number of I/Os per second 242, I/O bandwidth 243 (e.g., in megabytes per second or any appropriate units), the ratio of random to sequential I/O operations 244, the read/write ratio 245, the I/O size distribution 246, and/or the overall storage device utilization 247 for various devices. In some embodiments other persistent storage metrics, such as queue lengths for various I/O devices, supported block sizes, or storage protocols used, may also or instead be collected.

For networking-related resources 205, metrics collected may include total network bandwidth 251, upload to download ratio 252 (e.g., metrics about the relative amount of network data transfers from and to the computing infrastructure 176), network data transfer sizes 253, latency 254, the number of concurrent connections 255, network utilization 256, and/or congestion or error metrics 257. Information about the specific network protocols being used (e.g., how much traffic flows using the Transmission Control Protocol (TCP) versus the User Datagram Protocol (UDP)) may also be collected in some embodiments.

For main memory resources 207, metrics such as the memory utilization 261 and/or paging rates 262 may be collected in the depicted embodiment. In some embodiments various other metrics may be collected for applications or logical resources 209, such as application specific transaction rates 271, transaction response times 272, or other application-specific metrics 272 such as heap sizes, thread pool sizes, concurrent user sessions and the like. Such metrics may be obtained from data sources such as application management consoles or application management tools identified by the resource manager 181 in some embodiments.

In at least some embodiments, the resource manager 181 may be configured to gather various types of statistics about each of the metrics, such as the mean value of a metric over one or more time periods, the maximum value, minimum value, percentile distributions, and/or the variation in the metric value over different hours of the day, different days of the week, and so forth. Snapshots or collections of resource usage metrics for different points of time or for different time intervals may be stored in resource management database 190 in some embodiments.

In some embodiments, client classification categories may include application or resource availability/fault tolerance needs (e.g., a total outage time per year or outage count per year the client is willing to accept), security needs, isolation requirements (e.g., the extent to which a client is willing to share resources with other clients), installed software stacks (e.g., some clients may need software from vendor A, while others may need software from vendor B), concurrent user counts, and so forth. The resource manager 181 may collect quantitative and/or qualitative data on such categories from various sources in different embodiments—e.g., failure rates or mean times to repair may be collected for various resources, error logs or application logs may be scrutinized, inventories of installed software may be conducted, and so on.

FIG. 3 illustrates examples of client classification values determined for various combinations of clients and client classification categories, according to at least some embodiments. Each row in the table shown in FIG. 3 illustrates a set of client classification values for a particular client identified by an identifier 301, such as Client-C1, Client-C2, Client-C3, and so on. The resource usage for some clients (e.g., Client-C4 in the illustrated example) or all clients may further be partitioned for classification and recommendation purposes into a plurality of allocation buckets 325 in some implementations. For example, four different allocation buckets have been identified for Client-C4: a "Database-OLTP (online transaction processing)" bucket, a "Database-Data warehouse" bucket, a "WebApp1" bucket, and a "Backup Service" bucket. Each allocation bucket may represent the resources allocated to the client for a particular purpose or application in the depicted example. The resource manager 181 may be configured to identify various allocation buckets when possible, e.g., based on a knowledge of the types of applications or services being used by a client 148, and/or based on analysis of the service requests originating from the client 148. For example, responses to some types of service requests may take much longer (or consume more processor cycles or disk I/Os) than responses to other types, and allocation buckets may be defined based on the service request types. In some embodiments, the partition of a client's resources into allocation buckets 325 may be implemented by the resource manager simply based on an analysis of resource usage patterns or service request patterns over time, independently of the specific applications or services being used by the client. For example, the resource manager 181 may identify one pattern of resource usage of one set of resources during business hours by a given client 148, and a different pattern of resource usage of another set of resources by the same client during weekends or nights, and different allocation buckets may be set up for each of the different time periods. For some clients, such as Client-C1, Client-C2 and Client-C3 in FIG. 3, separate allocation buckets may not be used, or a single default allocation bucket may be used in some embodiments.

In the embodiment depicted in FIG. 3, seven different client categories 310 are used: processing, storage, network, memory, client budget, client geography, and client profile. For some of the categories, for which data sources such as monitors 130 that provide quantifiable metrics can be identified, each client (or combination of client and allocation bucket) has been given a classification value selected from a set of discrete choices such as "High", "Medium" and "Low" for a time period 305 over which the metrics were obtained. For example, for a time period 1/1/2012 through 1/31/2012, Client-C1 has been classified as a "High" processing resource user, based on processing-related metrics gathered from the compute resources used by Client-C1 during that period. Similarly, during that same period, Client-C1 has been classified as a "Low" memory user, a "Medium" storage user, and a "High" network user. With respect to the budget classification category, Client-C1 has been identified as having a "High" budget (e.g., based on the amounts billed to Client-C1 for its use of the computing infrastructure 176, relative to the total number of resources used by Client-C1, or relative to amounts billed to other users). Information about the geographical locations from which Client-C1's service requests originated (which may be determined by resource manager 181 from IP addresses of the client's devices or directly from physical address information provided by the client) may also be used for client classification—e.g., 90% of Client-C1's requests are shown as originating in a region termed "U.S. East" in the depicted example. Finally, clients may also be classified base on business-oriented or revenue-oriented criteria in some embodiments; for example, Client-C1 has been identified in FIG. 3 as a long-term customer with an overall high rate of revenue growth (i.e., the revenue realized by the operator of the computing infrastructure 176 has been growing at a high rate). It is noted that not all the classification values shown in FIG. 3 may be associated with a time period used for resource usage metric collection—e.g., the budget and the profile classifications may be based on longer time periods than the processing, storage, network or memory classifications.

With respect to the classification categories whose values are determined based on metrics obtained from computing infrastructure data sources, such as processing, storage, network, or memory, different clients (or different allocation buckets for the same client) may have different usage measurement iteration periods 305. For example, the time period for Client-C1 (1/1/2012-1/31/2012) differs from that for Client-C2 (2/1/2012-2/15/2012), and the period for Client-C4's WebApp1 allocation bucket differs from that for Client-C4's Backup Service allocation bucket. In the illustrated example, the time periods for each row may represent the most recent iteration of measurements for the client or (client, allocation bucket) combination. In some implementation, multiple sets of classification values may be retained for each client or allocation bucket, representing for example the N most recent iterations.

The resource manager 181 may be responsible for defining the different classification values (e.g., "High", "Medium" and "Low" for processing/storage/memory/network/budget, or the various geographic regions such as "U.S. East" or "Asia") being used for the different classification categories in some embodiments. In at least some embodiments, the range of resource usage levels that is associated with each possible value may change over time—e.g., what used to be classified as "High" processing usage in 2010 may be classified as "Medium" processing usage in 2012. Classification categories other than those shown in FIG. 3 may be used in some embodiments (for example, availability-related categories, security-related categories, installed software categories, and the like). In other embodiments some of the categories or values used may differ from those shown in FIG. 3.

FIG. 4 illustrates examples of resource classification values determined for various combinations of resources and resource classification categories, according to at least some embodiments. Each row in the table of FIG. 4 is associated with a respective resource identifier 405 (such as Server-S1, Server-S2 and so on), and shows values for a number of classification categories for the corresponding resource. Six example resource classification categories are shown: location, processing capacity, storage capacity, networking capacity, memory, and operating cost. Encodings of the values for each of the resource capacity categories (processing, storage, networking, and memory) are shown in the depicted embodiment. For example, processing capacity values may vary in the depicted embodiment from P1 (representing the lowest processing capacity stratum among the resources of the computing infrastructure 176) to P10 (representing the highest processing capacity stratum); similarly, storage capacity may vary from S1 to S10, networking capacity from N1 to N10, and memory capacity from M1 to M10. Similarly, values for the operating cost category may be selected from the range C1-C10. Values for the location category may indicate the data center and geographical region in which the resource is located, such as "DC-004" data center in region "U.S. East" for resource Server-S1.

In some embodiments, when resources are added or removed from the computing infrastructure 176, an inventory analysis may be initiated, e.g., by the resource manager 181 or by an administrator, to refresh or update the resource classification information 148 stored in the resource management database 190. As in the case of client classification value definitions, resource classification values may be defined by the resource manager 181 in some embodiments, and resource classification value definitions may also be adjusted over time—e.g., what used to qualify as a P10 processing resource in 2010 may only qualify as a P6 processing resource in 2012. In some embodiments, inventory analysis operations comprising resource classification may be performed periodically or in accordance with a schedule. In some implementations, the classification value of a given resource for a given category such as processing capacity may be selected based on specifications (e.g., specifications provided by the vendor from whom the resource was obtained), while in other implementations the value may be based on the results of test suites and/or measurements of production applications. In some embodiments, sharing status information may be included in the resource classification information for resources that can be shared among different clients or for different allocation buckets of the same client. The sharing status information for a particular resource may, for example, include an estimate of the fraction of the resource capacity that is currently available for allocation, or the fraction that is estimated to be available over some period of time. For a storage resource comprising 1 terabyte of disk space, for example, of which 500 gigabytes is currently allocated for other clients, the sharing status information may indicate that 50% of the storage capacity is currently available. In some embodiments and for some types of resources, several different values for sharing status may be used, e.g., for a server, one sharing status value may be used for processing capacity, another for disk storage, and so on.

The manner in which resource classification information is organized and/or stored may differ from that shown in FIG. 4 in some embodiments. For example, in one embodiment, instead of storing classification values for each resource separately, a small number of resource classes may be defined (e.g., "Small", "Medium", "Large" and "Extra-Large"), each class representing a corresponding set of resource capacities. For example a "Large" resource may be defined as a server with processing capacity in the range P8-P10, storage in the range S8-S10, and so on. Then, for each defined resource class, the number of instances of that class in each data center may be determined and stored in the resource management database 190. When a particular instance is to be allocated to a client from a given data center, an inventory record of that data center may be queried to find an appropriate instance. In various embodiments, different combinations of resource classification categories and possible value sets may be implemented than those shown in FIG. 4. The definitions of the various categories and values may also be stored in resource management database 190 in some embodiments, for resource classification, client classification, or both resource and client classifications.

FIG. 5 illustrates examples of recommendation mappings that may be generated for clients, according to at least some embodiments. As shown, each row of the table of FIG. 5 maps a client (or a (client, allocation bucket) combination) to a set of recommended resources. For some clients, such as Client-C2, a single resource such as "S432" has been recommended, while for other clients such as Client-C1, a plurality of resources has been recommended. In the depicted example, the mappings have associated recommended allocation periods 525: e.g., for Client-C1, the resource manager recommends that the resources S33 and S64 be allocated for the period 2/1/2012-2/28/2012. In some embodiments, allocation time periods may not be determined, and the generated mapping may be assumed to remain valid indefinitely, or until a new recommendation is triggered.

The resource manager 181 may generate the recommendation mappings based on the client classifications 146, allocation buckets 325, and resource classifications 148 in the depicted embodiment. In embodiments where allocation buckets are not used, the mappings may be based simply on client and resource classifications. In some embodiments, when generating the recommendation mappings, the resource manager may take into account all the resources present in a given data center 110, or in a combination of several data centers 110. In other embodiments, a search for resources matching a client's needs may be limited to currently-free resources in some data center or centers. Restricting the search to currently-free resources may help to reduce the work required for re-allocations—e.g., if a resource R1 that is recommended for a client C1 is already in use by client C2, then C2 may have to be provided a different resource R2 if R1 is allocated to C1. In at least some implementations, for sharable resources (i.e., resources that are not exclusively designated for use by a single client) the resource manager 181 may take a resource's current sharing status into account when generating the mappings—for example, metrics gathered from one or more monitors associated with a given resource, or an analysis of existing resource allocations, may be used to determine what fraction of a resource is available, and whether the available fraction is sufficient for the client for whom the mapping is being generated. In some embodiments, sharing status information may be included in the resource classification information. Various search techniques and/or other algorithms or heuristics may be used to ensure that recommendation mappings are generated efficiently and with minimal overhead. For example, according to one heuristic, a search for matching resources may first be conducted in the same data center where a client's currently-allocated resources reside, and the search may be expanded to other data centers only if no appropriate resource is available at the original data center. In at least some embodiments, one or more formulas may be used to generate the recommendation mappings. Inputs to such a formula may include, for example, values for each of a plurality of client classification categories and relative weights to be associated with each of the values for a given client or client allocation bucket. The output of the formula may include a list of resources or resource types appropriate for allocation to the client, ranked in order of suitability for the client. In embodiments where formulas are used, the resource manager may tune or modify the formula (e.g., by changing the weights associated with various inputs) over time, e.g., to optimize costs or to enhance performance as perceived by the client.

Figure 6:
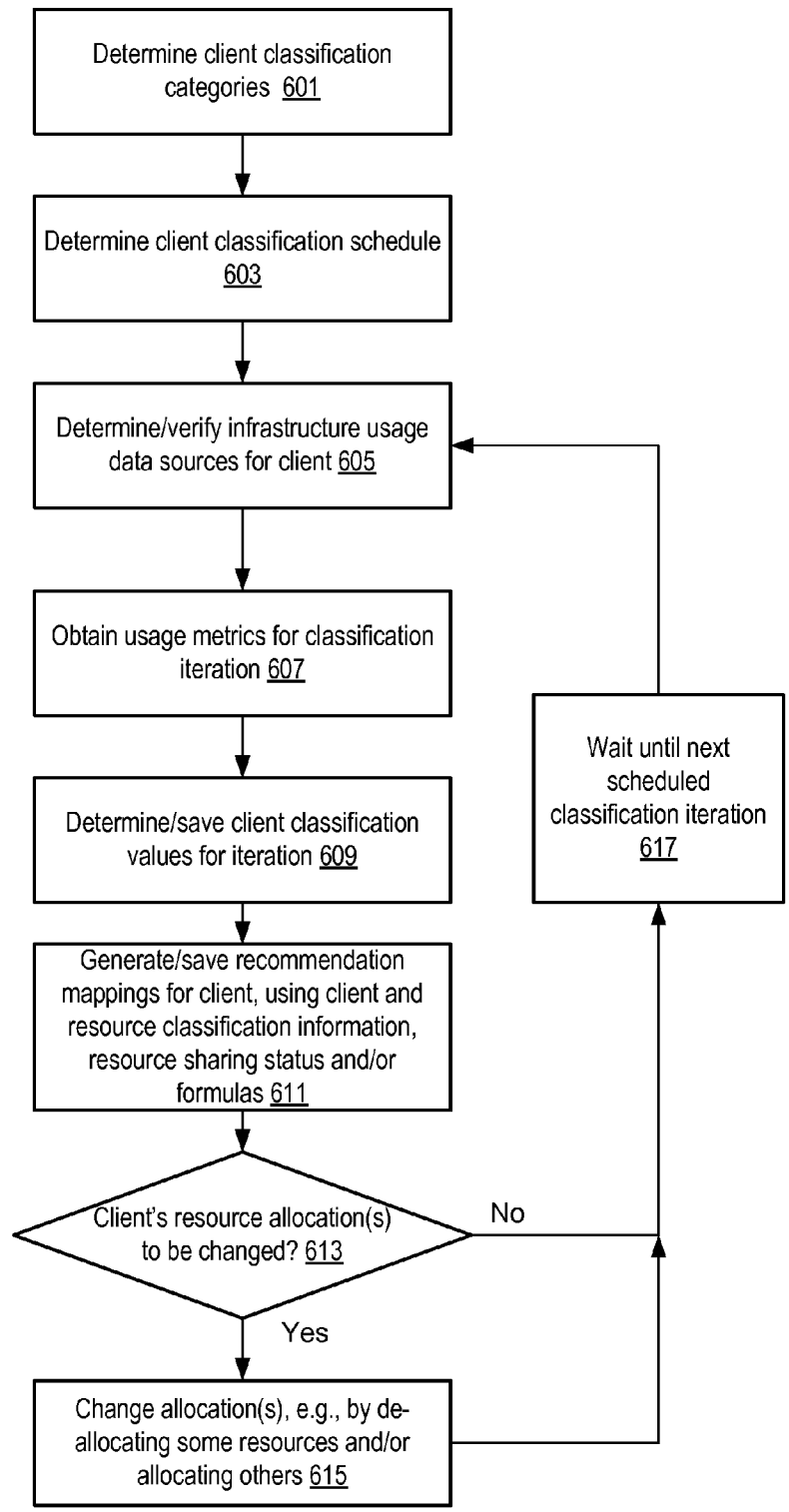
FIG. 6 is a flow diagram illustrating aspects of the operation of a resource manager configured to generate recommendation mappings for clients, according to at least some embodiments.

FIG. 6 is a flow diagram illustrating aspects of the operation of a resource manager configured to generate recommendation mappings for clients, according to at least some embodiments. It is noted that although allocation buckets are not explicitly mentioned in FIG. 6, similar operations as those illustrated in FIG. 6 for a client may be performed for a (client, allocation bucket) combination in some embodiments. As shown in element 601, a resource manager 181 may determine a set of client classification categories that are to be used for generating recommendation mappings in the depicted embodiment. The resource manager 181 may also determine a client classification schedule (element 603 of FIG. 6), e.g., a decision to validate or modify the classification values for a given client once a month or once a week may be made. Classification schedules may be determined based on a variety of factors in different embodiments: such as elapsed time since a previous assignment of client classification values, measurements of overall (i.e., not client-specific) data center resource utilization indicating underutilization or overutilization of various sets of resources, measures of operating costs associated with the computing infrastructure (e.g., rising power, cooling or facility maintenance costs that are not accompanied by corresponding rising revenues), or metrics of client satisfaction (for example, complaints about poor performance from a particular client may lead trigger an iteration of classification and mapping generation). For a given classification iteration for a given client, the resource manager 181 may determine the infrastructure usage data sources to be used (element 605). If some or all the data sources needed had been identified for a previous classification iteration, the resource manager may validate the data sources, e.g., by checking that they still provide the expected metrics. In at least some embodiments, one or more of the infrastructure usage data sources may comprise monitors or tools associated with or executing on devices external to the computing infrastructure 176—e.g., the computing infrastructure provider may request that a third-party intermediary network provider, or the client, install monitors or activate monitoring at a client device, or at a network device used for connectivity between the client and the resources of the computing infrastructure 176.

Having identified and/or validated the data sources to be used for the current client classification iteration, the resource manager 181 may obtain the resource usage metrics from those data sources (element 607). In some embodiments resource usage metrics may be gathered for various resources 120 of the computing infrastructure for other purposes as a matter of course (e.g., to ensure that none of the resources gets so overloaded that service level agreements for performance are jeopardized), and the resource manager 181 may simply filter the already-collected usage data to obtain or deduce at least some of the client-specific data it needs for generating recommendation mappings. In other embodiments, monitoring tools may be invoked specifically to obtain at least some of the inputs needed for the mappings. Client classification values for the set of classification categories being used in the current iteration may then be determined (element 609). The values may be saved in a persistent repository such as resource management database 190 in some embodiments.

Using the client classification values and resource classification information, the resource manager 181 may generate the recommendation mappings (element 611). In at least some embodiments, information about the sharing status of resources may also be used when generating the mappings—e.g., whether a particular resource is currently shared by other clients, and if so, what fraction of the resource capacity is available for allocation. In some implementations, sharing status may be included in the resource classification information. The mappings may be saved in a persistent repository such as resource management database 190 in at least one embodiment. In some embodiments, formulas whose inputs may include the client classification values with associated weights may be used to determine the mappings. If the recommendation mappings indicate that the client's current resource allocation(s) should be changed, as determined in element 613, the resource manager may change the allocation (element 615)—e.g., by allocating a different resource to the client, and/or de-allocating or freeing a resource currently allocated to the client. A number of different types of resource allocation changes may be implemented depending on the recommendation mappings in various embodiments—e.g., applications or data may be moved from one set of devices to another, existing workloads directed to one resource may be distributed across multiple resources, and so on. In one example scenario, database table contents may be moved from one set of storage devices or file systems to another. In another scenario, servers offered by a public cloud infrastructure provider may be deployed to execute some application that was previously being executed at a private cloud data center. A limit on the number of concurrent network connections or ports available for use by a client may be changed in another example scenario. After changing the allocation(s) as needed, or if no changes are required, the resource manager 181 may wait until the next iteration of client classification is scheduled (element 617), and then repeat the operations illustrated in elements 605 onwards.

The resource manager 181 may have incomplete or inaccurate information about client resource usage in some scenarios. For example, some resource usage data may be lost, some resource usage may be mistakenly attributed to the wrong client, or the resource manager may have to determine resource allocations for a client for the first time (i.e., with no information about actual resource usage by the client). In such scenarios, the resource manager 181 may use one of various techniques in some embodiments. For example, in one embodiment, the resource manager 181 may shorten the iterations over which resource usage is gathered; instead of collecting resource usage data over a month for a given client, resource usage data may be collected for a week or for a few days at a time, recommendation mappings may be generated, and then the process may be repeated one or more times, each time with a slightly longer period of usage metric collection. Thus, the resource manager 181 may attempt to reduce the impact of inaccurate or incomplete inputs by modifying or adapting the periods over which data is collected. In situations where earlier-gathered resource utilization data is available, the resource manager 181 may make projections about the missing metrics based on the existing data—e.g., using linear extrapolation or trend analysis. For initial resource allocations before any usage data is available, in some embodiments the resource manager may rely on the client's input—e.g., the client may be asked about expected transaction rates or resource utilization, and the resource manager may use the client's input for an initial set of resource allocations. After the initial resource allocation, the resource manager may start classification iterations as described above, adjusting the data-collection periods as needed.

Figure 7:
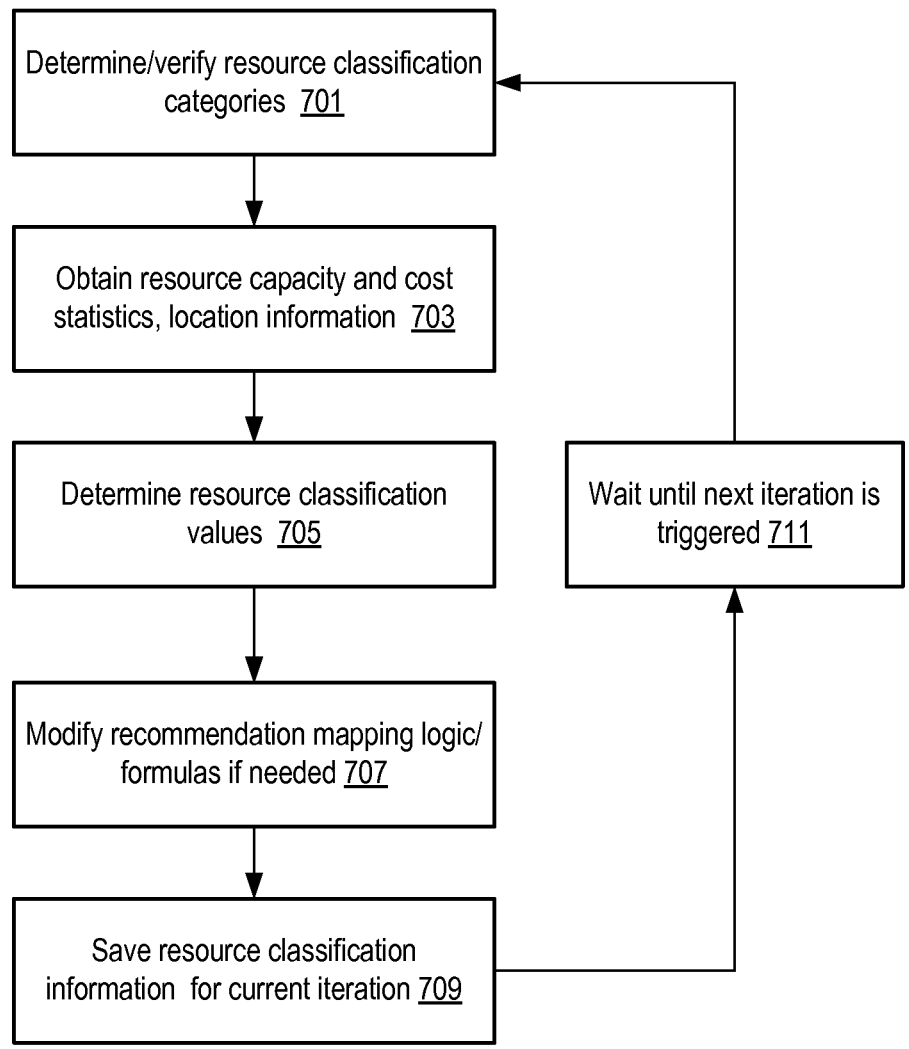
FIG. 7 is a flow diagram illustrating aspects of the operation of a resource manager configured to classify resources of a computing infrastructure, according to at least some embodiments.

FIG. 7 is a flow diagram illustrating aspects of the operation of a resource manager configured to classify resources of a computing infrastructure, according to at least some embodiments. As shown in element 701, for a given iteration of resource classification, the resource manager 181 may determine or verify the resource classification categories to be used to generate recommendation mappings. The resource manager 181 may then obtain the inputs needed for resource classification, such as resource capacity or capability statistics, operating costs for the resources, or locations of the resources (element 703). The resource capacity statistics may be based on specifications provided by the vendor of the resource, and/or on measurements of actual resource usage. Based on the inputs, the resource manager 181 may determine values to assign to each of the categories for a particular resource (element 705). As described earlier, in some embodiments the resource manager may define a set of discrete values for each category, from which one may be selected—e.g., for processing capabilities, a range P1-P10 may be defined, with P1 indicating low processing power and P10 indicating high processing power. In some embodiments and for some resource classification categories, the set of discrete values selectable may not necessarily represent a mathematical ordering from "low" to "high" or from "high" to "low"—e.g., in one embodiment, the possible values for processing capacity of servers may include information about the type of processor architecture or chipsets used, so that different values simply represent alternative processor designs rather than comparative performance levels.

In at least some embodiments, the formulas or the logic used to generate recommendation mappings may have to be adjusted when resource classifications change (element 707). The resource classifications determined in the current iteration may be saved, e.g., in resource management database 190 in some embodiments. The resource manager may then wait until the next iteration of resource classification is scheduled or triggered (element 711), e.g., as part of an inventory analysis, or when equipment is added or removed from the computing infrastructure 176. The operations corresponding to elements 701 onwards may then be repeated for the next iteration. In at least some embodiments, resource classification may be performed just once for a resource, and repeated iterations may not be implemented.

Figure 8:
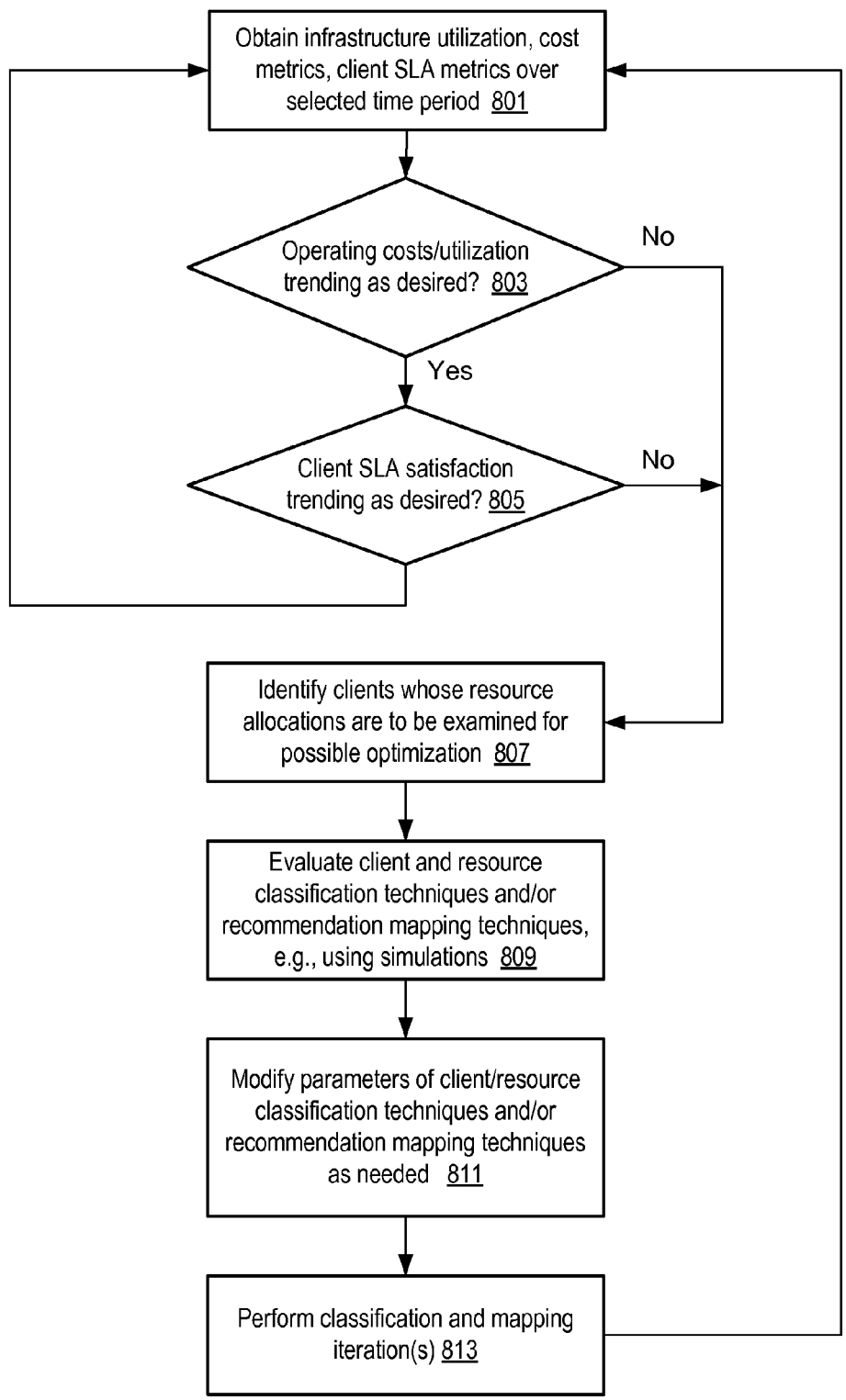
FIG. 8 is a flow diagram illustrating aspects of the operation of a resource manager configured to dynamically adjust parameters used for generating recommendation mappings, according to at least some embodiments.

FIG. 8 is a flow diagram illustrating aspects of the operation of a resource manager configured to dynamically adjust parameters used for generating recommendation mappings, according to at least some embodiments. As shown in element 801 of FIG. 8, in the depicted embodiment, the resource manager 181 may obtain some combination of utilization and cost metrics for the computing infrastructure over some time period, and/or client service-level agreement (SLA) satisfaction metrics (indicating for example whether any performance or other requirements of clients are being met relatively easily, or whether some requirements are being met only with difficulty, or not being met at all). The utilization metrics may indicate, for example, whether some subset of the resources (or all of the resources) of the computing infrastructure 176 are overloaded or underused. Based on the collected metrics, the resource manager may determine (as indicated in element 803) whether the trends for operating costs and/or utilization are satisfactory. In some embodiments, the resource manager may compute the return on investment for the computing infrastructure 176, or portions of the infrastructure such as a given data center, to help determine whether the costs are trending as desired. The resource manager 181 may also in some embodiments determine whether the performance requirements or other SLAs established for clients are being satisfied as desired. In some embodiments the resource manager 181 may also be provided feedback obtained from clients regarding satisfaction levels with performance, availability and the like.

If detected trends or results in operating costs, inventory utilization, or customer SLA satisfaction are unsatisfactory, the resource manager 181 may identify a set of clients whose resource allocations are to be examined for possible optimization (element 807). If the trends for cost, utilization and satisfaction are acceptable, the resource manager may resume collecting the metrics indicated in element 801. For the clients identified as possible candidates for optimization, the resource manager may evaluate the classification techniques and/or mapping generation techniques used (element 809). For example, in some embodiments a simulation may be performed (e.g., using a simulation model of at least a portion of the computing environment 176) in which some of the parameters associated with client or resource classification (such as the number of categories of each type, the ranges of possible values for the categories) or for mapping generation (e.g., the weights assigned to various inputs for generating the mappings, the search algorithms or techniques used to find resources, and/or the formulas used) are varied. The results of the simulation may be used to determine whether any parameter modifications appear advisable. One or more parameters of the classification techniques for clients and resources, and/or the mapping generation techniques may be changed based on the evaluation (element 811), and one or more additional classification and mapping generation iterations may be performed using the modified parameters (element 813). In this way the resource manager 181 may attempt to improve the trends or results for operating costs, utilization, and/or client satisfaction.

Figure 9:
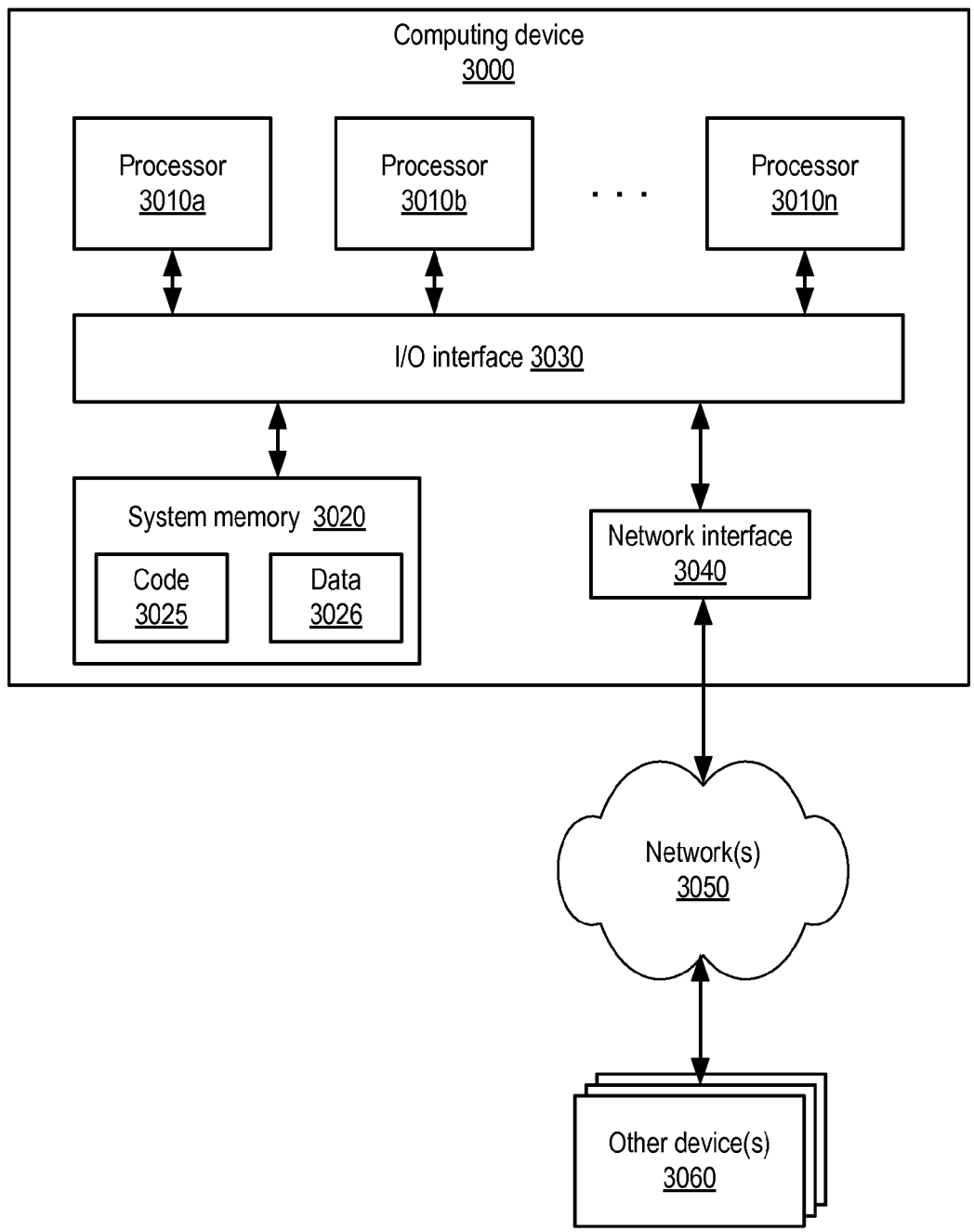
FIG. 9 illustrates an example computing device that may be used in some embodiments.

FIG. 9 illustrates an example computing device 3000 that may be used in some embodiments to implement at least some of the functionality of the resource manager 181. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010, or a multiprocessor system including several processors 3010 (e.g., two, four, eight, or another suitable number). Processors 3010 may be any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIG. 1 through FIG. 8, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 3000 via I/O interface 3030. A non-transitory computer-accessible storage medium may also include any volatile or non-volatile media such as RAM (e.g. SDRAM, DDR SDRAM, RDRAM, SRAM, etc.), ROM, etc, that may be included in some embodiments of computing device 3000 as system memory 3020 or another type of memory. Further, a computer-accessible medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
   determining a respective set of infrastructure usage data sources corresponding to one or more clients of a computing infrastructure, wherein a plurality of resources of the computing infrastructure are available for allocation to the one or more clients;
   analyzing, for a particular client of the one or more clients, resource usage patterns to determine a plurality of allocation buckets associated with different types of applications that have been executed on behalf of the particular client, wherein a first allocation bucket comprises a first subset of resources allocated for a first type of application of the particular client and a second allocation bucket comprises a different subset of the resources allocated for a second type of application of the particular client;
   assigning, to one or more client classification categories associated with the allocation buckets of the particular client, a respective client classification value, wherein said client classification value is based at least in part on one or more metrics obtained from the particular client's set of infrastructure usage data sources;
   generating a recommendation mapping between one or more client classification values of the one or more client classification categories and one or more resources of the plurality of resources of the computing infrastructure to be implemented for a defined allocation time period, wherein said generating the recommendation mapping is based at least in part on resource classification information associated with the one or more resources;
   allocating at least a portion of the one or more resources to the particular client based at least in part on the recommendation mapping, wherein a notification is generated in response to a change in the one or more resources allocated to the particular client; and
   in response to a performance metric for the computing infrastructure failing to meet a threshold, performing a simulation in which parameters used for generating recommendation mappings are varied to determine if one or more of the parameters should be modified,
   the parameters comprising at least one of: weights assigned to the one or more client classification categories, a search algorithm used to determine the one or more resources of the computing infrastructure, or a mapping formula,
   the performance metric corresponding to one or more of: (i) customer service-level agreement(SLA)satisfaction and (ii) operating costs of the computing infrastructure, wherein, when the simulation determines the one or more parameters should be modified, subsequent recommendation mapping generation iterations are performed using the modified parameters.

2. The method as recited in claim 1, wherein, prior to said determining, the particular client is allocated a set of resources of the computing infrastructure including at least one of: a compute resource, a memory resource, a persistent storage resource, or a networking resource; and
wherein the particular client's infrastructure usage data sources comprise at least one of: a processor utilization monitor, a memory monitor, a storage monitor, a network monitor, or an application monitor for at least one application executed on behalf of the particular client.

3. The method as recited in claim 1, wherein the one or more client classification categories comprise respective categories for at least one of: compute performance, memory size, storage capacity, storage bandwidth, storage operation rate, network bandwidth, network operation rate, network latency, client budget, client geographical location, installed software stacks, application transaction rate, application availability, application security, or concurrent user count.

4. The method as recited in claim 1, wherein the resource classification information comprises respective resource classification values for one or more resource classification categories associated with a particular resource of the one or more resources, wherein the one or more resource classification categories include at least one sharing status category, wherein the method further comprises:
assigning, to the one or more resource classification categories, a respective resource classification value.

5. The method as recited in claim 1, further comprising:
scheduling iterations of assignment of client classification values based on one or more scheduling criteria;
wherein said assigning is performed in accordance with a schedule determined using the one or more scheduling criteria.

6. The method as recited in claim 5, wherein the one or more scheduling criteria include a criterion based on one or more of: (a) elapsed time since a previous assignment of client classification values, (b) a metric of data center resource utilization corresponding to a plurality of clients, (c) a metric of operating costs associated with the computing infrastructure, or (d) a metric of a client satisfaction.

7. The method as recited in claim 1, wherein said generating the recommendation mapping comprises generating a respective recommendation mapping for each of the first and second allocation buckets based at least in part on metrics obtained from infrastructure usage data sources associated with the subsets of the resources.

8. The method as recited in claim 1, wherein said determining the allocation buckets comprises characterizing the resource usage patterns that include processing usage, memory usage, and storage usage.

9. A system, comprising:
one or more processors; and
a memory comprising program instructions executable by the one or more processors to:
determine a respective set of infrastructure usage data sources corresponding to one or more clients of a computing infrastructure, wherein a plurality of resources of the computing infrastructure are available for allocation to the one or more clients;
analyze, for a particular client of the one or more clients, resource usage patterns to determine a plurality of allocation buckets associated with different types of applications that have been executed on behalf of the particular client, wherein a first allocation bucket comprises a first subset of resources allocated for a first type of application of the particular client and a second allocation bucket comprises a different subset of the resources allocated for a first type of application of the particular client;
assign, to one or more client classification categories associated with the allocation buckets of the particular client, a respective client classification value, wherein said client classification value is based at least in part on one or more metrics obtained from the particular client's set of infrastructure usage data sources;
generate a recommendation mapping between one or more client classification values of the one or more client classification categories and one or more resources of the plurality of resources of the computing infrastructure to be implemented for a defined allocation time period, wherein said generating the recommendation mapping is based at least in part on resource classification information associated with the one or more resources;
allocate at least a portion of the one or more resources to the particular client based at least in part on the recommendation mapping; and
in response to a performance metric for the computing infrastructure failing to meet a threshold, perform a simulation in which parameters used for generating recommendation mappings are varied to determine if one or more of the parameters should be modified, the parameters comprising at least one of: weights assigned to the one or more client classification categories, a search algorithm used to determine the one or more resources of the computing infrastructure, or a mapping formula,
the performance metric corresponding to one or more of: (i) customer service-level agreement (SLA) satisfaction and (ii) operating costs of the computing infrastructure, wherein, when the simulation determines the one or more parameters should be modified, subsequent recommendation mapping generation iterations are performed using the modified parameters.

10. The system as recited in claim 9, wherein the instructions are executable by the one or more processors to allocate a set of resources of the computing infrastructure to the particular client prior to a determination of the infrastructure usage data sources, wherein the set comprises at least one of: a compute resource, a memory resource, a persistent storage resource, or a networking resource; and
wherein the infrastructure usage data sources comprise at least one of: a processor utilization monitor, a memory monitor, a storage monitor, a network monitor, or an application monitor for at least one application executed on behalf of the particular client.

11. The system as recited in claim 9, wherein the one or more client classification categories comprise respective categories for at least one of: compute performance, memory size, storage capacity, storage bandwidth, storage operation rate, network bandwidth, network operation rate, network latency, client budget, client geographical location, installed software stacks, application transaction rate, application availability, application security, or concurrent user count.

12. The system as recited in claim 9, wherein the resource classification information comprises respective resource classification values for one or more resource classification categories associated with a particular resource of the one or more resources, wherein the instructions are executable on the one or more processors to:
assign, to the one or more resource classification categories, a respective resource classification value.

13. The system as recited in claim 9, wherein the instructions are executable on the one or more processors to:
schedule iterations of assignment of client classification values to the one or more client classification categories based on one or more criteria, including a criterion based on one or more of: (a) elapsed time since a previous assignment of client classification values, (b) a metric of data center resource utilization corresponding to a plurality of clients, (c) a metric of operating costs associated with the computing infrastructure, or (d) a metric of a client satisfaction.

14. The system as recited in claim 9, wherein said generating the recommendation mapping comprises generating a respective recommendation mapping for each of the first and second allocation buckets based at least in part on metrics obtained from infrastructure usage data sources associated with the subsets of the resources.

15. A non-transitory computer-readable storage medium storing program instructions, wherein the program instructions are computer-executable to implement:
determining a respective set of infrastructure usage data sources corresponding to one or more clients of a computing infrastructure, wherein a plurality of resources of the computing infrastructure are available for allocation to the one or more clients;
analyzing, for a particular client of the one or more clients, resource usage patterns to determine a plurality of allocation buckets associated with different types of applications that have been executed on behalf of the particular client, a first allocation bucket comprises a first subset of resources allocated for a first type of application of the particular client and a second allocation bucket comprises a different subset of the resources allocated for a second type of application of the particular client;
assigning, to one or more client classification categories associated with the allocation buckets of the particular client, a respective client classification value, wherein said client classification value is based at least in part on one or more metrics obtained from the particular client's set of infrastructure usage data sources;
generating a recommendation mapping between one or more client classification values of the one or more client classification categories and one or more resources of the plurality of resources of the computing infrastructure to be implemented for a defined allocation time period, wherein said generating the recommendation mapping is based at least in part on resource classification information associated with the one or more resources;
allocating at least a portion of the one or more resources to the particular client based at least in part on the recommendation mapping, wherein a notification is generated in response to a change in the one or more resources allocated to the particular client; and
in response to a performance metric for the computing infrastructure failing to meet a threshold, performing a simulation in which parameters used for generating recommendation mappings are varied to determine if one or more of the parameters should be modified,
the parameters comprising at least one of: weights assigned to the one or more client classification categories, a search algorithm used to determine the one or more resources of the computing infrastructure, or a mapping formula,
the performance metric corresponding to one or more of: (i) customer service-level agreement (SLA) satisfaction and (ii) operating costs of the computing infrastructure, wherein, when the simulation determines the one or more parameters should be modified, subsequent recommendation mapping generation iterations are performed using the modified parameters.

16. The storage medium as recited in claim 15, wherein, prior to said determining, the particular client is allocated a set of resources of the computing infrastructure including at least one of: a compute resource, a memory resource, a persistent storage resource, or a networking resource; and wherein the infrastructure usage data sources comprise at least one of: a processor utilization monitor, a memory monitor, a storage monitor, a network monitor, or an application monitor for at least one application executed on behalf of the particular client.

17. The storage medium as recited in claim 15, wherein the one or more client classification categories comprise respective categories for at least one of: compute performance, memory size, storage capacity, storage bandwidth, storage operation rate, network bandwidth, network operation rate, network latency, client budget, client geographical location, installed software stacks, application transaction rate, application availability, application security, or concurrent user count.

18. The storage medium as recited in claim 15, wherein the resource classification information comprises respective resource classification values for one or more resource classification categories associated with a particular resource of the one or more resources, wherein the program instructions further comprise:
assigning, to the one or more resource classification categories, a respective resource classification value.

19. The storage medium as recited in claim 15, wherein, prior to said determining, the particular client is allocated a first server located at a private cloud data center, wherein said allocating at least a portion of the one or more resources to the particular client comprises allocating a second server located at a public cloud data center, wherein the program instructions are computer-executable to implement:
removing the first server from a set of resources allocated to the particular client.

20. The storage medium as recited in claim 15, wherein prior to said determining, the particular client is allocated a first set of database storage configured to store one or more database tables of the particular client, said allocating at least a portion of the one or more resources to the particular client comprises allocating a second set of database storage configurable to store the one or more database tables, wherein the program instructions are computer-executable to implement:
moving contents of the one or more database tables from the first set of database storage to the second set of database storage.

* * * * *